INVENTOR
F. VRATNY
BY Edward M. Fink
ATTORNEY

United States Patent Office
3,574,143
Patented Apr. 6, 1971

3,574,143

RESISTIVE COMPOSITION OF MATTER AND DEVICE UTILIZING SAME

Frederick Vratny, Berkeley Heights, N.J., assignor to Bell Telephone Laboratories, Incorporated, Murray Hill and Berkeley Heights, N.J.

Filed Feb. 19, 1969, Ser. No. 800,536
Int. Cl. H01b *1/06*
U.S. Cl. 252—520 6 Claims

ABSTRACT OF THE DISCLOSURE

A novel resistive composition of matter of the general formula $(M,Hf)N_{2-x}$ wherein M is selected from the group consisting of tantalum and titanium and $x$ ranges from 0.0–0.5 is obtained by reactive sputtering of metal cathodes in the presence of nitrogen at pressures ranging from 10–150 microns.

This invention relates to a resistive composition of matter. More particularly, the present invention relates to a resistive composition of matter which is of particular interest for use in a light sensitive storage device.

Recently, there has been a birth of interest in a class of light sensitive storage devices which are suitable for use as television camera tubes. Such devices typically include a target structure comprising a planar n-type semiconductor having an array of isolated p-type regions thereon which form junction diodes in the substrate. In the operation of the device, the substrate member is maintained at a fixed potential with respect to the tube cathode and an electron scanning beam is used to reverse bias each successive diode segment to a voltage equal to the difference in potential of the substrate and the cathode, the leakage current of the diodes in the absence of light being sufficiently small that the diodes will remain in the reverse biased condition for more than one second. Light impinging on the n-type substrate from the side opposite the electron beam and immediately adjacent to the diodes increases the leakage current by photon production of hole-electron pairs. If the beam again scans the p-type surface, recharging it to cathode potential and thus establishing the full value of reverse bias, the charge it deposits on each of the p-type regions equals the charge removed by the leakage current during the preceding frame period. This charge in turn is dependent upon the localized light intensity to which that segment of the semiconductor has been subjected. Recharging of the diode is accompanied by a current through the external circuit. This current, over a frame period, varies in proportion to the spatial distribution of the light intensity at successive portions of the scanning electron beam and constitutes the video output signal.

More lately, a device of the noted type was described wherein the diodes are proportioned so that the electron beam impinges upon several simultaneously to avoid problems from inexact registration of the target structure and failures of the individual diodes. The structure so described also includes an insulating coating upon the portion of the semiconductor substrate on the electron beam target surface which serves to shield the substrate from the beam. A conductive coating overlies the insulating coating to control the potential of the surface and is connected to a bias source to drain electrons from the insulator. The capacitance of the diode junctions is increased to a suitable level by depositing separate conductive contacts or islands electrically isolated from the conductive coating, over the diodes.

In order to avoid the tedious processes needed to provide conductive islands separate from the conductive coating, a configuration was developed wherein a semi-insulating layer was substituted for the conductive coating upon the insulating layer to moderate charge buildup thereon. Materials employed for this purpose evidence a discharge time constant greater than the frame time of the camera tube by substantially less than the discharge time constant of the highly insulating coating. These criteria have been met by materials evidencing sheet resistances within the range of $10^{13}$ to $10^{14}$ ohms/square. Compositions found suitable for this purpose include silicon monoxide, antimony trisulfide, cadmium sulfide, zinc sulfide, arsenic trisulfide, and so forth. Unfortunately, none of the prior art materials has proven to be completely satisfactory from the standpoint of stability, high temperature vacuum baking required for long tube life often resulting in degradation of the electrical characteristics of the material.

In accordance with the present invention, the prior art limitations are effectively obviated by the use of a novel resistive composition of matter of the general formula $(M,Hf)N_{2-x}$ wherein M is selected from the group consisting of tantalum, titanium or mixtures thereof and $x$ ranges from 0.0 to 0.5. The novel resistive compositions described herein are mixed compounds which are obtained by reactive sputtering of mixed metal cathodes in the presence of nitrogen. Compositions so prepared evidence specific resistivities within the range of $10^5$ ohm-centimeters to $10^{10}$ ohm-centimeters and are able to withstand high temperature baking with no greater than a decade change in resistivity.

The invention will be more fully understood by reference to the following detailed description taken in conjunction with the accompanying drawing wherein.

Figure 4:
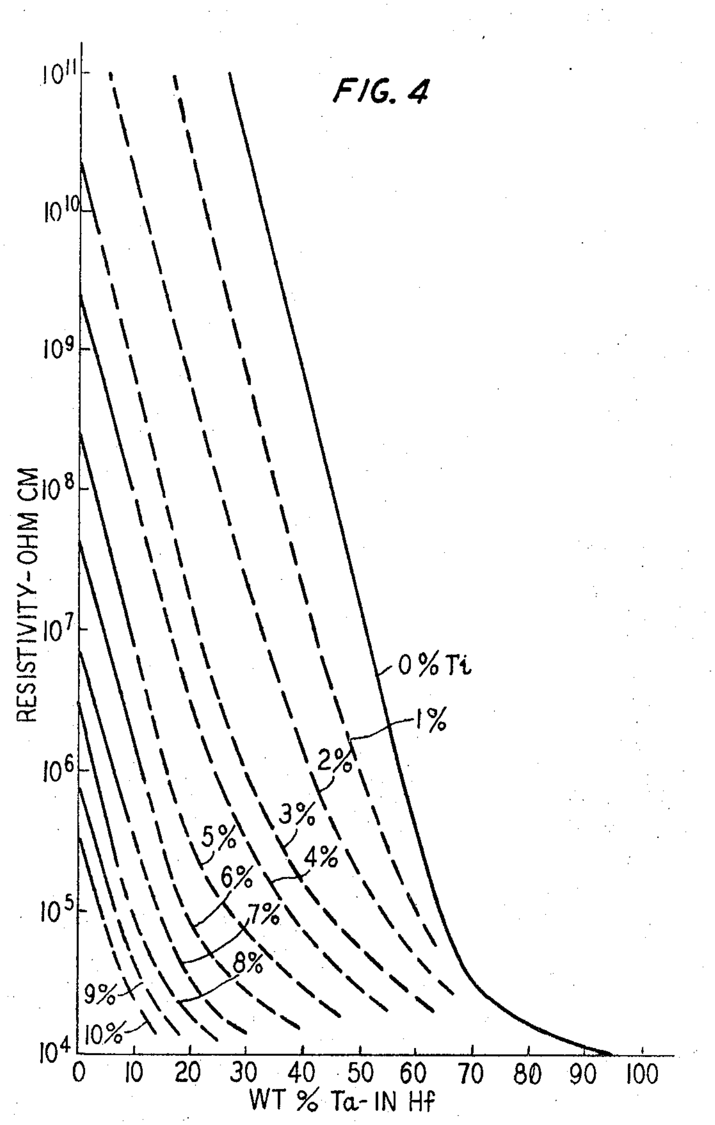
Figure 3:
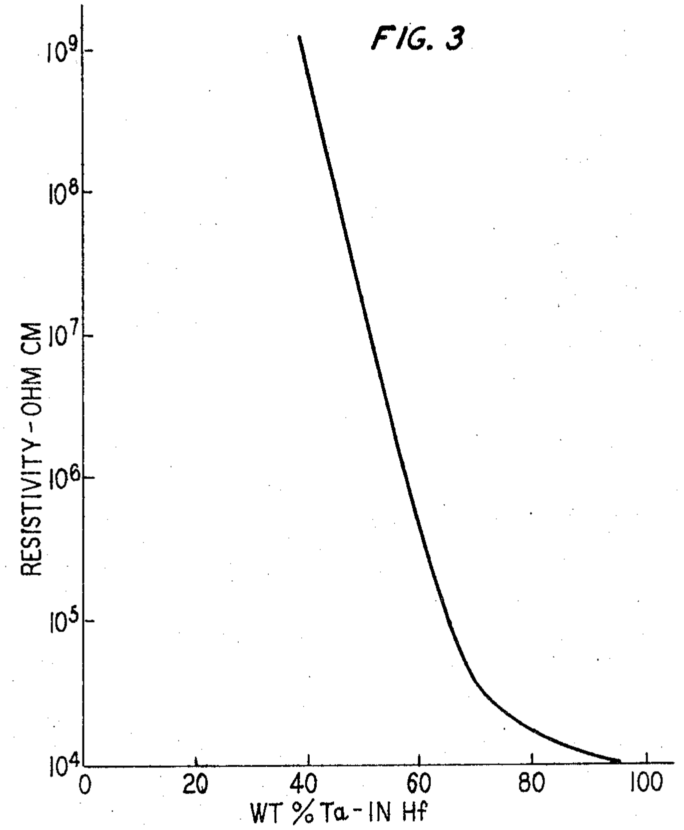

FIG. 3 is a graphical representation on coordinates of weight percent tantalum in hafnium against resistivity in ohm-centimeters showing variations in resistivity as a function of varying composition in accordance with the invention; and FIG. 4 is a graphical representation on coordinates of weight per cent tantalum in hafnium against resistivity in ohm-centimeters showing variations in resistivity as a function of varying titanium composition in accordance with the invention.

Figure 1:
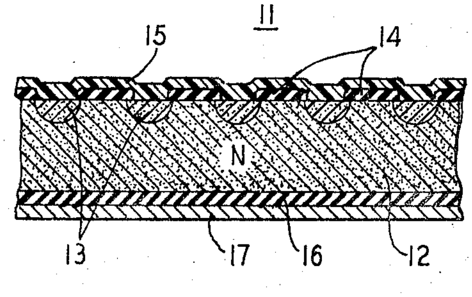
FIG. 1 is a cross-sectional view of a portion of a target structure of a television camera tube in accordance with the invention.

With reference now to FIG. 1, there is shown in cross-sectional view a typical target structure including the inventive composition of matter. Shown in the figure is a target structure 11 comprising a semiconductive wafer, the major portion of which is an n-type substrate 12 having a plurality of insulated p-type regions 13 along the target surface thereof. A highly insulating coating 14 covers the entire target surface side of substrate 12, regions 13 remaining exposed. The coating 14 typically has a thickness within the range of 0.01 to 0.6 micron and overlaps the edges of p-type regions 13 to shield the end region from the electron beam and to protect the junctions against shorting. A layer of resistive material 15 in accordance with the invention is deposited over insulating coating 14 and p-type regions 13, such layer evidencing a discharge time constant of approximately one second. A transparent silicon dioxide layer 16 is deposited upon the back surface of substrate 12 and is covered with an essentially transparent conductor electrode 17.

As noted above, compositions suitable for use in the practice of the present invention are of the general formula $(M,Hf)N_{2-x}$ wherein M is selected from the group consisting of tantalum, titanium, or mixtures thereof and $x$ ranges from 0.0 to 0.5. Deposition of the desired composition in film form may conveniently be effected by reactive sputtering of a composite cathode in the presence of nitrogen at (nitrogen) pressures ranging from 10 to 150 microns. The cathode employed in the practice of the present invention may be an M-Hf alloy containing from 35 to 96 weight percent M where M is tantalum, and from 4 to 14 weight percent where M is titanium, or a composite M-Hf cathode that is constructed so that the desired geometric ratio of M to hafnium over the entire area ranges from 35 to 96 percent where M is tantalum, and from 4 to 14 percent when M is titanum. It has been found that the geometric area of M in the composite structure corresponds approximately with the weight percent M in the deposited film. Deposited films containing less than or greater than the stated amounts of M do not evidence the characteristics required for the diode area storage devices alluded to above. With respect to the ternary system, $(Ta,Ti,Hf)N_{2-x}$, the same considerations apply. Thus, it has been found that the required characteristics are obtained by starting with alloy cathodes or composites comprising from 0.1 to 14 weight percent titanium, 1 to 96 weight percent tantalum, and from 4 to 99 weight percent hafnium.

The present invention may conveniently be described in detail by reference to an illustrative example wherein a tantalum-hafnium composite cathode is employed to deposit a thin film thereof upon a suitable substrate by reactive sputtering in accordance with the invention.

The substrate selected for use herein is first vigorously cleaned by conventional cleaning techniques well known in the art. Thereafter, the substrate is placed in a sputtering apparatus such as a conventional DC sputtering system, an RF–DC sputtering system, and so forth. As indicated above, the composition of the cathode may range from 35 to 96 weight percent tantalum, remainder hafnium. The conditions to be employed in the deposition of the desired film are known (see "Vacuum Deposition of Thin Films" L. Holland, J. Wiley & Sons, New York (1956) or copending application, Ser. No. 537,086, filed Mar. 24, 1966 now Pat. No. 3,461,054). In accordance with the described technique, the vacuum chamber is first evacuated, flushed with an inert gas, as for example, any of the members of the rare gas family such as helium, argon, or neon, the chamber re-evacuated and nitrogen introduced thereto at a pressure within the range of 10 to 150 microns. Variations in the nitrogen pressure at either end of the noted range result in the formation of lower nitrides which evidence properties that are inadequate for use in the devices alluded to above. Thus, studies have revealed that in order to obtain compositions of the general formula $(M,Hf)N_{2-x}$, as described above, wherein $x$ ranges from 0.0 to 0.5, it is essential that the nitrogen pressure be within the noted range.

The voltage necessary to produce a sputtered layer of tantalum hafnium nitride suitable for the purposes of this invention may range from 1 to 10 kilovolts DC. The balancing of the various factors of voltage pressure and relative positions of the cathode, anode, and substrate to obtain a high quantity deposit is well known in the sputtering art.

With reference now more particularly to the example under discussion, by employing a proper voltage, pressure and spacing of the elements within the vacuum chamber, a layer of tantalum hafnium nitride is deposited upon the substrate in a desired configuration. Sputtering is conducted for a period of time calculated to produce a film having a desired thickness. For the purposes of this invention, the thickness is determined by the ultimate value of sheet resistance or specific resistivity desired. The thickness of the deposited film is preferably within the range of 500 to 1000 A., such range being based upon a film resistivity of $10^8$ ohm-centimeters and the requirement of a proper discharge time in the resistive film. However, these limits are not considered absolute and variations may be made by an order of magnitude in either direction.

Following the sputtering step, the resultant tantalum hafnium nitride layer is vacuum baked at temperatures ranging from 250° to 500° C. for a time period ranging from 0.5 to 24 hours for the purpose of stabilizing the deposited films. The temperature limits during the baking stage are dictated by considerations relating to the removal of gases in the tube envelope and the ultimate device stability. During the vacuum baking step, it has been found that the specific resistivity of the films is altered by an order of magnitude. Accordingly, in order to obtain films manifesting specific resistivities within the range of $10^5$ to $10^{10}$ ohm-centimeters, it is necessary to sputter films evidencing a specific resistivity ranging from $10^4$ to $10^9$ ohm-centimeters.

Figure 2:
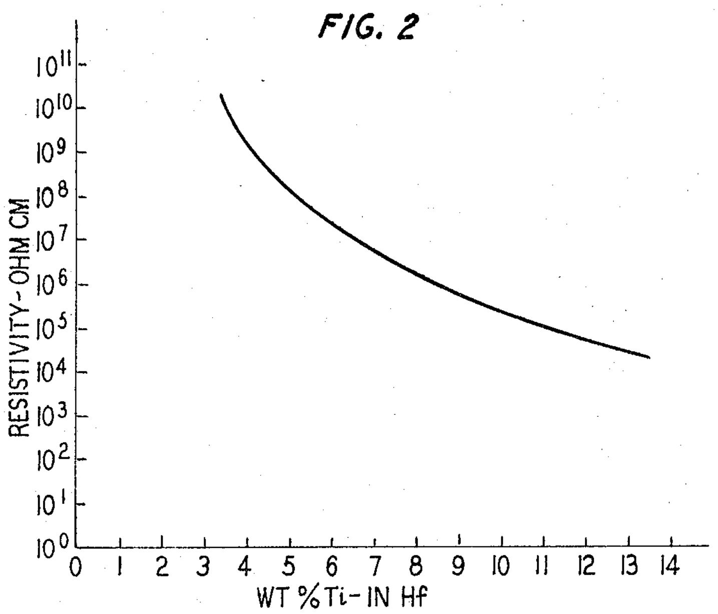
FIG. 2 is a graphical representation on coordinates of weight percent titanium in hafnium against resistivity in ohm-centimeters showing variations in resistivity as a function of varying composition in accordance with the invention.

With reference now to FIG. 2, there is shown a graphical representation showing variations in resistivity for titanium hafnium nitride sputtered films of varying composition. It has been found that during the vacuum baking stage described above, the resistivity increases by an order of magnitude. Accordingly, in order to obtain specific resistivities within the desired range of $10^5$ to $10^{10}$ ohm-centimeters, the composition sputtered initially must comprise from 4 to 14 weight percent titanium, remainder hafnium.

Similarly, in the case of tantalum-hafnium compositions, the initially sputtered material must comprise from 35 to 96 weight percent tantalum, remainder hafnium (see FIG. 3).

With reference now to FIG. 4, there is shown a graphical representation of the ternary system titanium tantalum hafnium nitride, which reveals that the desired resistivity can be obtained with compositions comprising from 0.1 to 14 weight percent titanium, 1 to 96 weight percent tantalum, and from 4 to 99 weight percent hafnium.

Examples of the invention are described in detail below. These examples and the illustration described above are included merely to aid in the understanding of the invention, and variations may be made by one skilled in the art without departing from the spirit and scope of the invention.

EXAMPLE I

This example describes the preparation of a tantalum hafnium nitride film in a cathodic sputtering apparatus by RF–DC sputtering techniques.

A 1" x 3" glass microscope slide was employed as the substrate. The slide was boiled in aqua regia, rinsed in distilled water, and flame dried to produce a clean surface. The cathode employed was a tantalum-hafnium 6" square composite structure comprising 35 weight percent tantalum, remainder hafnium.

The vacuum chamber was initially evacuated to a pressure of the order of $10^{-6}$ torr and nitrogen admitted thereto at a pressure of $60 \times 10^{-3}$ torr. The anode and cathode were spaced approximately 3" apart, with an electron extraction grid spaced approximately 1" from the substrate at a position immediately outside Crooke's Dark Space. A DC voltage of approximately 4000 volts was then impressed between the cathode and anode and approximately 100 watts of RF power imposed thereon. A shuttered presputter was performed for 30 minutes after which the shutter was removed and sputtering conducted for a time period of 36 minutes, so yielding a layer of tantalum hafnium nitride containing approximately 35 weight percent tantalum, 1800 A. in thickness. The resultant film evidenced a resistivity of $6.4 \times 10^7$ ohm-centimeters.

EXAMPLE II

In order to determine the stability of the described films under high temperature conditions, the procedure of Example I was repeated with cathodes of varying compositions and the resultant films vacuum heat treated in an ion pumped system at a pressure of $1\times10^{-8}$ torr at 430° C. for 16 hours, the initial pressure surge in the system during heating being within the range of $10^{-4}$ to $10^{-5}$ torr. Film sheet resistances were obtained at room temperature and temperatures ranging down to —90° C. Nitrogen was used to flush the low temperature dewar employed and to assure the absence of water. The results are set forth in the following table:

TABLE 3

[Change in sheet resistance of $(Ta,Hf)N_2$ films by a vacuum bake at 430° C.]

| | Sheet resistance, ohm/square | | |
|---|---|---|---|
| Wt. percent tantalum | $R_{s_0}$ Before bake | $R_s$ After bake | |
| 58.7 | $2\times10^{10}$ | $3.5\times10^{10}$ | 1.75 |
| 54 | $3.4\times10^{12}$ | $6.0\times10^{11}$ | 0.17 |
| 53 | $4.\times10^{12}$ | $7.5\times10^{12}$ | 1.63 |

It is noted from the table that the sheet resistance of the vacuum baked samples increased on the average by less than an order of magnitude.

EXAMPLE III

A silicon diode array target similar to that shown in FIG. 1 had deposited thereon tantalum hafnium nitride in the manner described in Example I. The resultant resistive sea (36.5 percent tantalum, 63.5 percent hafnium) met all the requirements for this device in that it evidenced a resistivity of $6.8\times10^8$ ohm-centimeters and a sheet resistance of $4\times10^{13}$ ohm/square for a thickness of approximately 900 A.

What is claimed is:

1. $(M,Hf)N_{2-x}$, wherein M is selected from the group consisting of tantalum, titanium and mixtures thereof and $x$ ranges from 0.0 to 0.5, M being present in an amount ranging from 35 to 96 weight percent when M is tantalum, from 4 to 14 weight percent when M is titanium, and from 0.1 to 14 weight percent titanium, and from 1 to 96 weight percent tantalum when M is a mixture of tantalum and titanium.

2. Composition in accordance with claim 1 wherein M is titanium.

3. Composition in accordance with claim 1 wherein M is tantalum.

4. Composition in accordance with claim 1 wherein M is a mixture of tantalum and titanium.

5. Composition in accordance with claim 3 comprising 35 weight percent tantalum, remainder hafnium.

6. Electron beam storage device including a resistive sea comprising a composition of matter of the general formula $(M,Hf)N_{2-x}$, wherein M is selected from the group consisting of tantalum, titanium, and mixtures thereof and $x$ ranges from 0.0 to 0.5, M being present in an amount ranging from 35 to 96 weight percent when M is tantalum from 4 to 14 weight percent when M is titanium, and from 0.1 to 14 weight percent titanium, and from 1 to 96 weight percent tantalum when M is a mixture of tantalum and titanium.

References Cited

UNITED STATES PATENTS 3,394,087 7/1968 Huang ............ 252—520

DOUGLAS J. DRUMMOND, Primary Examiner

U.S. Cl. X.R.

252—501, 518